United States Patent
Hovden

(10) Patent No.: US 7,609,885 B2
(45) Date of Patent: Oct. 27, 2009

(54) SYSTEM AND METHOD FOR EFFECTIVELY IMPLEMENTING A TEXTURE FEATURE DETECTOR

(75) Inventor: Gunnar Hovden, Los Gatos, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 695 days.

(21) Appl. No.: 11/196,981

(22) Filed: Aug. 4, 2005

(65) Prior Publication Data

US 2007/0031035 A1    Feb. 8, 2007

(51) Int. Cl.
*G06K 9/00*    (2006.01)

(52) U.S. Cl. ...................................... 382/169

(58) Field of Classification Search ............. 382/155, 382/159, 165, 168–172, 174, 181, 190, 192, 382/194, 218–219, 224–225, 233, 235–236, 382/238–239, 248, 250, 305; 348/672; 358/403; 706/18, 20, 25, 934; 707/1, 3–6, 10, 104.1
See application file for complete search history.

(56) References Cited

U.S. PATENT DOCUMENTS

| | | | |
|---|---|---|---|
| 5,734,893 A * | 3/1998 | Li et al. ...................... 707/4 |
| 6,175,650 B1 * | 1/2001 | Sindhu et al. ............... 382/171 |
| 6,404,925 B1 * | 6/2002 | Foote et al. ................. 382/224 |
| 6,594,386 B1 * | 7/2003 | Golshani et al. ............ 382/166 |
| 6,694,311 B1 * | 2/2004 | Smith ............................ 707/4 |
| 7,046,865 B2 * | 5/2006 | Kasutani ..................... 382/305 |
| 7,130,864 B2 * | 10/2006 | Lin et al. ................. 707/104.1 |
| 7,167,574 B2 * | 1/2007 | Kim ........................... 382/100 |
| 7,171,060 B2 * | 1/2007 | Park et al. .................. 382/305 |
| 7,251,370 B2 * | 7/2007 | Labelle ...................... 382/239 |
| 7,254,285 B1 * | 8/2007 | Paek et al. ................. 382/305 |
| 2002/0178135 A1 | 11/2002 | Tanaka |

* cited by examiner

*Primary Examiner*—Jose L Couso
(74) *Attorney, Agent, or Firm*—Gregory J. Koerner; Redwood Patent Law

(57) ABSTRACT

A system and method are disclosed for performing an image search procedure in which a histogram calculator initially performs image analysis procedures to construct horizontal and vertical texture histograms corresponding to texture characteristics of subject images. A feature detector may then perform the image search procedure by comparing the texture histograms to identify one or more matching images in which texture characteristics are most similar.

20 Claims, 9 Drawing Sheets

Fig. 3    222

SYSTEM AND METHOD FOR EFFECTIVELY IMPLEMENTING A TEXTURE FEATURE DETECTOR

BACKGROUND SECTION

1. Field of the Invention

This invention relates generally to techniques for analyzing information, and relates more particularly to a system and method for effectively implementing a texture feature detector.

2. Description of the Background Art

Implementing effective methods for analyzing information is a significant consideration for designers and manufacturers of contemporary electronic devices. However, effectively analyzing information with electronic devices may create substantial challenges for system designers. For example, enhanced demands for increased device functionality and performance may require more system processing power and require additional hardware resources. An increase in processing or hardware requirements may also result in a corresponding detrimental economic impact due to increased production costs and operational inefficiencies.

Furthermore, enhanced device capability to perform various advanced operations may provide additional benefits to a system user, but may also place increased demands on the control and management of various device components. For example, an enhanced electronic device that effectively analyzes and manipulates digital image data may benefit from an efficient implementation because of the large amount and complexity of the digital data involved.

Due to growing demands on system resources and substantially increasing data magnitudes, it is apparent that developing new techniques for analyzing information is a matter of concern for related electronic technologies. Therefore, for all the foregoing reasons, developing effective systems for analyzing information remains a significant consideration for designers, manufacturers, and users of contemporary electronic devices.

SUMMARY

In accordance with the present invention, a system and method are disclosed for effectively implementing a texture feature detector. In one embodiment, a texture histogram calculator initially converts original images into corresponding grey-scale images. The texture histogram calculator then divides the grey-scale images into a pre-defined number of contiguous pixel blocks that each include an array of horizontal pixel rows and vertical pixel columns. Next, the texture histogram calculator performs Discrete Fourier Transform (DFT) procedures upon the horizontal pixel rows and vertical pixel columns of each of the pixel blocks to generate corresponding horizontal DFT coefficients and vertical DFT coefficients.

The texture histogram calculator locates horizontal peak values for each of the horizontal pixel rows. Each horizontal peak value may correspond to the largest horizontal DFT coefficient for a given horizontal pixel row. The texture histogram calculator may then populate a horizontal texture histogram for each image with the corresponding horizontal peak values.

Similarly, the texture histogram calculator locates vertical peak values for each of the vertical pixel columns. Each vertical peak value may correspond to the largest vertical DFT coefficient for a given vertical pixel column. The texture histogram calculator may then populate a vertical texture histogram for each image with the corresponding vertical peak values.

Finally, a texture feature detector may perform image search procedures by comparing the horizontal texture histograms and the vertical texture histograms for each image to locate one or more images with the highest degree of similarity. For at least the foregoing reasons, the present invention therefore provides an improved system and method for effectively implementing a texture feature detector.

DETAILED DESCRIPTION

The present invention relates to an improvement in information analysis techniques. The following description is presented to enable one of ordinary skill in the art to make and use the invention and is provided in the context of a patent application and its requirements. Various modifications to the disclosed embodiments will be readily apparent to those skilled in the art and the generic principles herein may be applied to other embodiments. Thus, the present invention is not intended to be limited to the embodiments shown, but is to be accorded the widest scope consistent with the principles and features described herein.

The present invention comprises a system and method for performing image search procedures in an electronic device. A histogram calculator initially performs image analysis procedures to construct horizontal and vertical texture histograms corresponding to texture characteristics of subject images. A feature detector may then perform image search procedures by comparing the texture histograms to identify one or more matching images in which texture characteristics are most similar.

Figure 1:
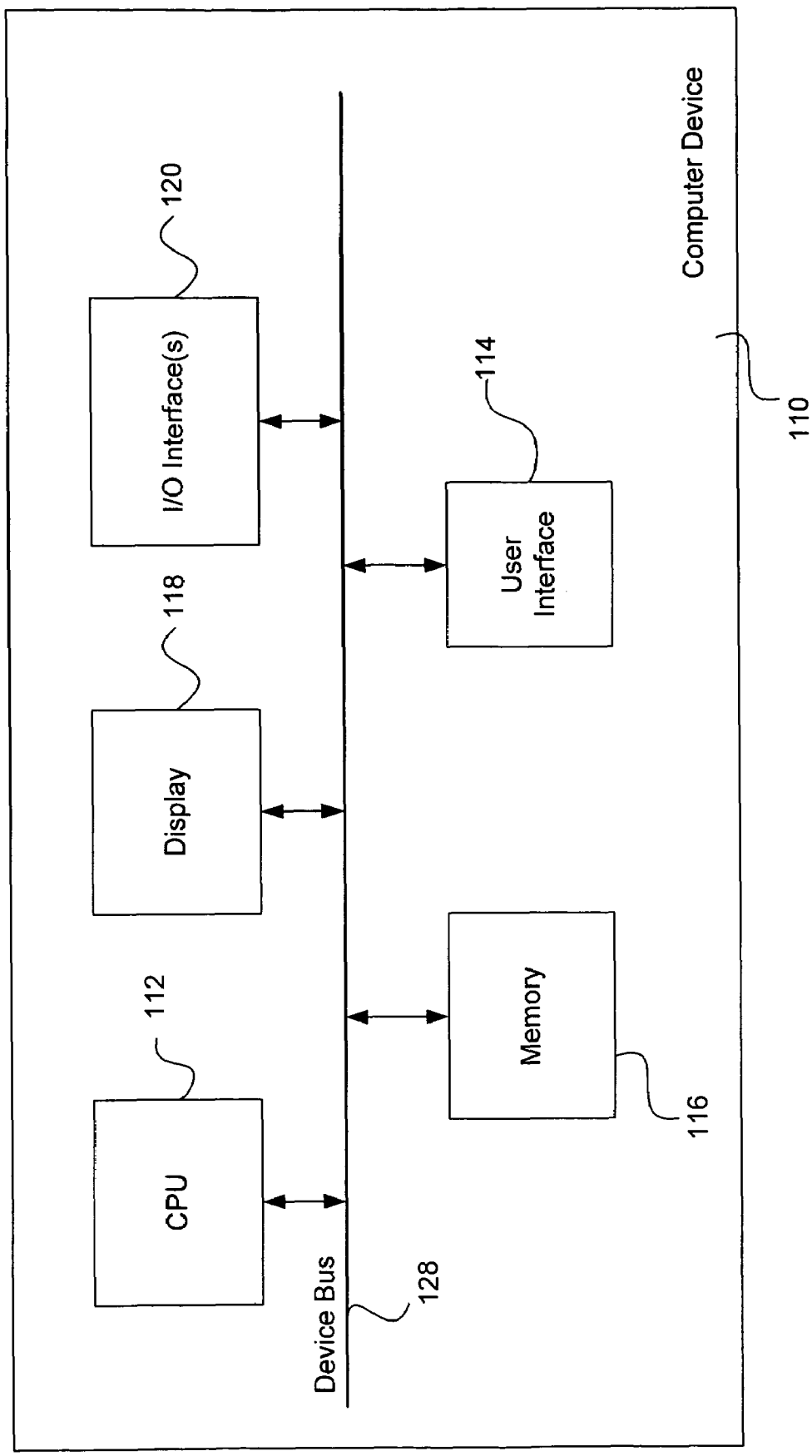
FIG. 1 is a block diagram for one embodiment of a computer device, in accordance with the present invention.

Referring now to FIG. 1, a block diagram for one embodiment of a computer device 110 is shown, in accordance with the present invention. In the FIG. 1 embodiment, computer device 110 includes, but is not limited to, a central processing unit (CPU) 112, a user interface 114, memory 116, a display 118, and input/output interface(s) (I/O interface(s)) 120. The foregoing components of computer device 110 may preferably be coupled to, and communicate through, a device bus 128.

In alternate embodiments, computer device 110 may readily be implemented using components and configurations in addition to, or instead of, certain of those components and configurations discussed in conjunction with the FIG. 1 embodiment. Furthermore, the present invention may readily be performed by various types of electronic devices other than computer device 110.

In the FIG. 1 embodiment, CPU 112 may be implemented to include any appropriate and compatible microprocessor device that preferably executes software instructions to control and manage the operation of image manager 110. The FIG. 1 display 118 may include any effective type of display technology including a cathode-ray-tube monitor or a liquid-crystal display device. In the FIG. 1 embodiment, I/O interface(s) 120 may include one or more input and/or output interfaces to receive and/or transmit any required types of relevant information by computer device 110.

In the FIG. 1 embodiment, memory 116 may include any combination of desired storage devices, including, but not limited to, read-only memory (ROM), random-access memory (RAM), and various types of non-volatile memory, such as floppy disks or hard disks. The contents and functionality of memory 116 are further discussed below in conjunction with FIGS. 2 and 3.

Figure 2:
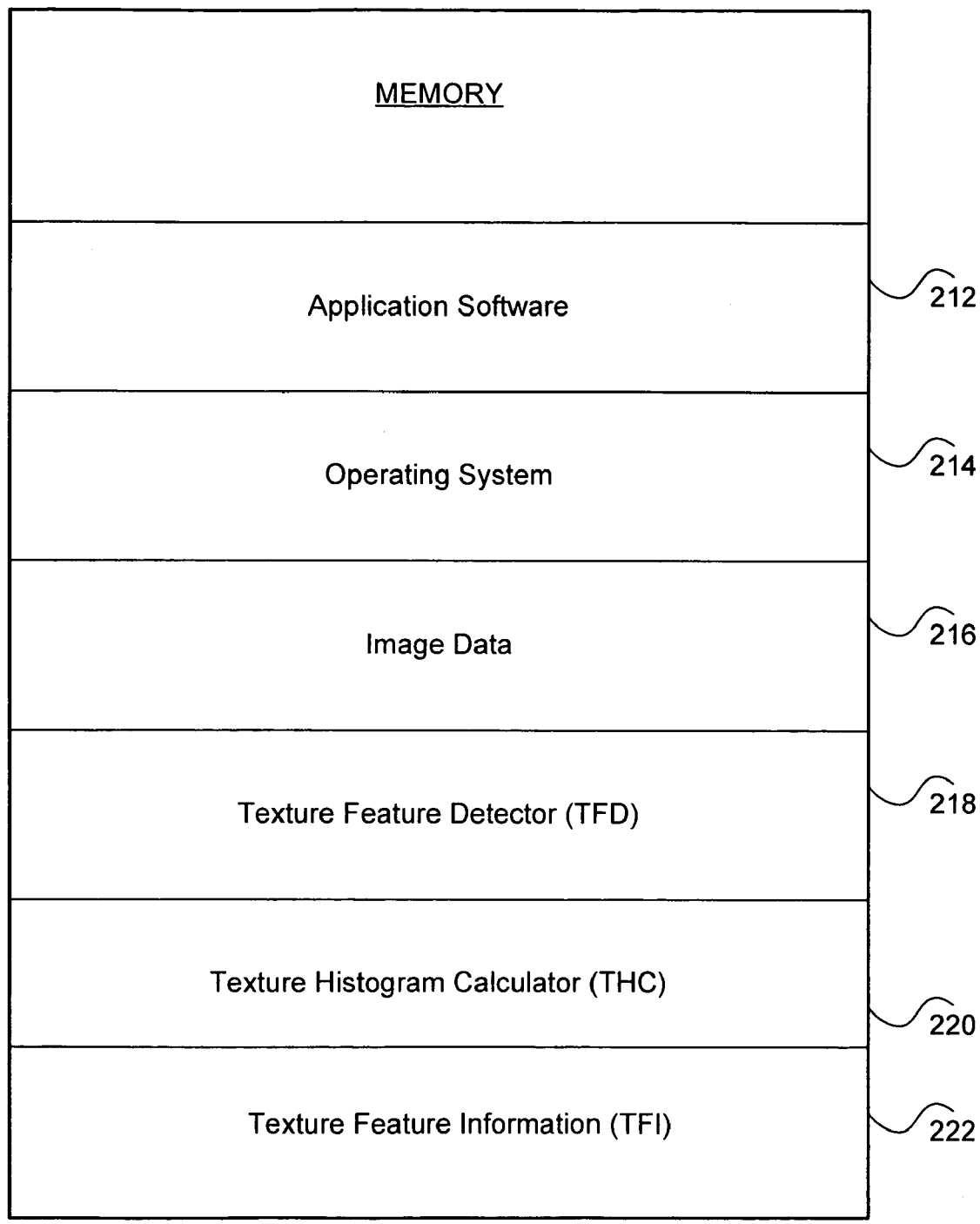
FIG. 2 is a block diagram for one embodiment of the memory of FIG. 1, in accordance with the present invention.

Referring now to FIG. 2, a block diagram for one embodiment of the FIG. 1 memory 116 is shown, in accordance with the present invention. In the FIG. 2 embodiment, memory 116 includes, but is not limited to, application software 212, an operating system 214, image data 216, texture feature detector 218, a texture histogram calculator 220, and texture feature information 222. In alternate embodiments, memory 116 may readily include other components in addition to, or instead of, certain of those components discussed in conjunction with the FIG. 2 embodiment.

In the FIG. 2 embodiment, application software 212 may include program instructions that are executed by CPU 112 (FIG. 1) to perform various functions and operations for computer device 110. The particular nature and functionality of application software 212 may vary depending upon factors such as the specific type and particular use of the corresponding computer device 110. In the FIG. 2 embodiment, operating system 214 controls and coordinates low-level functionality of computer device 110.

Image data 216 includes various types of data that is stored in memory 116. Image data 216 may include captured image data or other types of information. For example, in certain embodiments, image data 216 may include one or more images that a system user obtains from an external source such as a camera device or the Internet. In alternate embodiments, the present invention may readily be utilized to analyze data other than the image data 216 shown in FIG. 2.

In the FIG. 2 embodiment, texture feature detector 218 may be utilized to analyze texture feature information 222 to thereby perform image search procedures. Texture histogram calculator (THC) 220 may be utilized to generate corresponding texture feature information 222 relating to image data 216. One embodiment for texture feature information 222 is further discussed below in conjunction with FIG. 3. Furthermore, the utilization of THC 220 to generate texture feature information 222 is further discussed below in conjunction with FIGS. 4-9.

Figure 3:
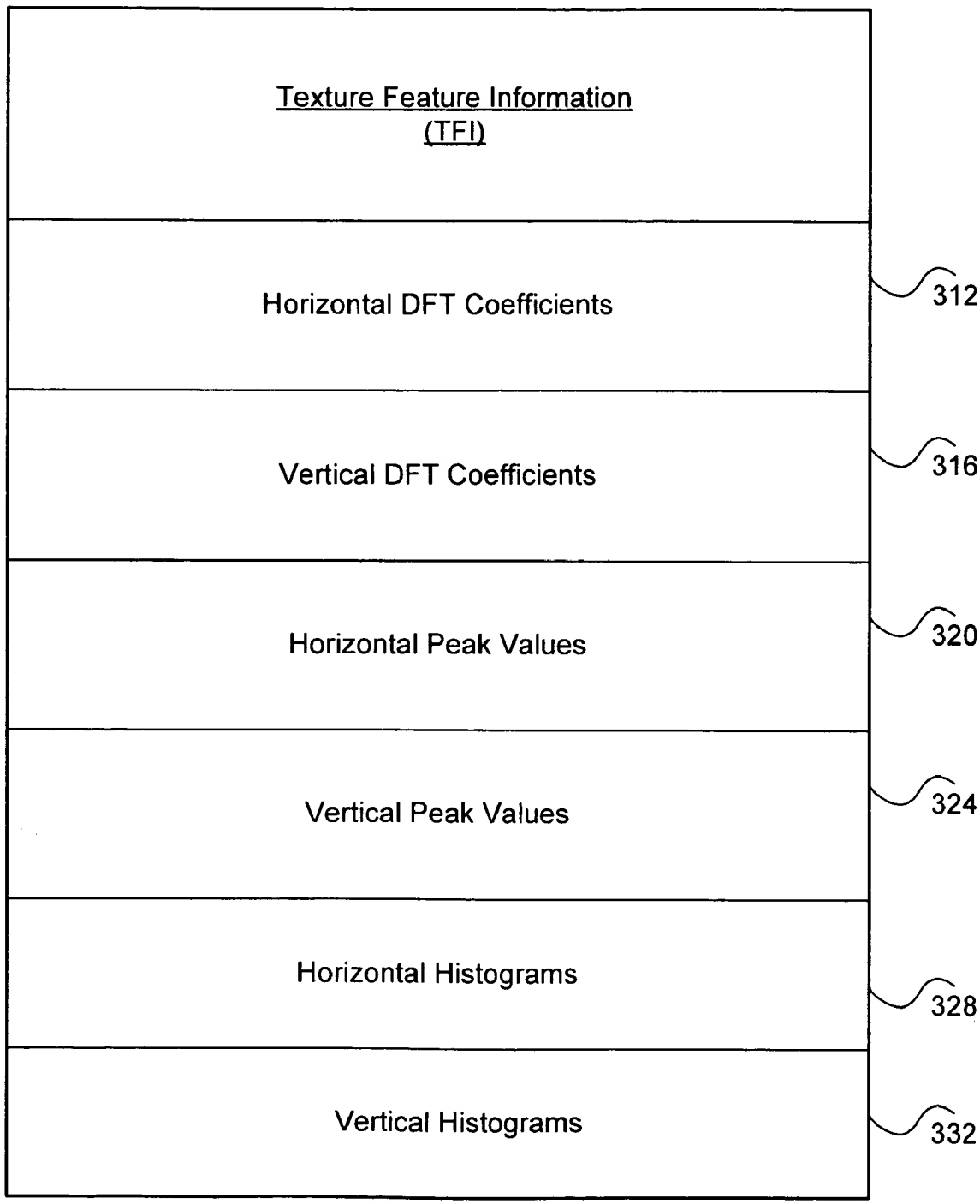
FIG. 3 is a block diagram for one embodiment of the texture feature information of FIG. 2, in accordance with the present invention.

Referring now to FIG. 3, a block diagram for one embodiment of the FIG. 2 texture feature information 222 is shown, in accordance with the present invention. In the FIG. 3 embodiment, texture feature information 222 may include, but is not limited to, horizontal DFT coefficients 312, vertical DFT coefficients 316, horizontal peak values 320, vertical peak values 324, horizontal histograms 328, and vertical histograms 332. In alternate embodiments, texture feature information 222 may readily include other components in addition to, or instead of, certain of those components discussed in conjunction with the FIG. 3 embodiment. The generation of texture feature information 222 by THC 220 (FIG. 2) is further discussed below in conjunction with FIGS. 4-9.

Figure 4:
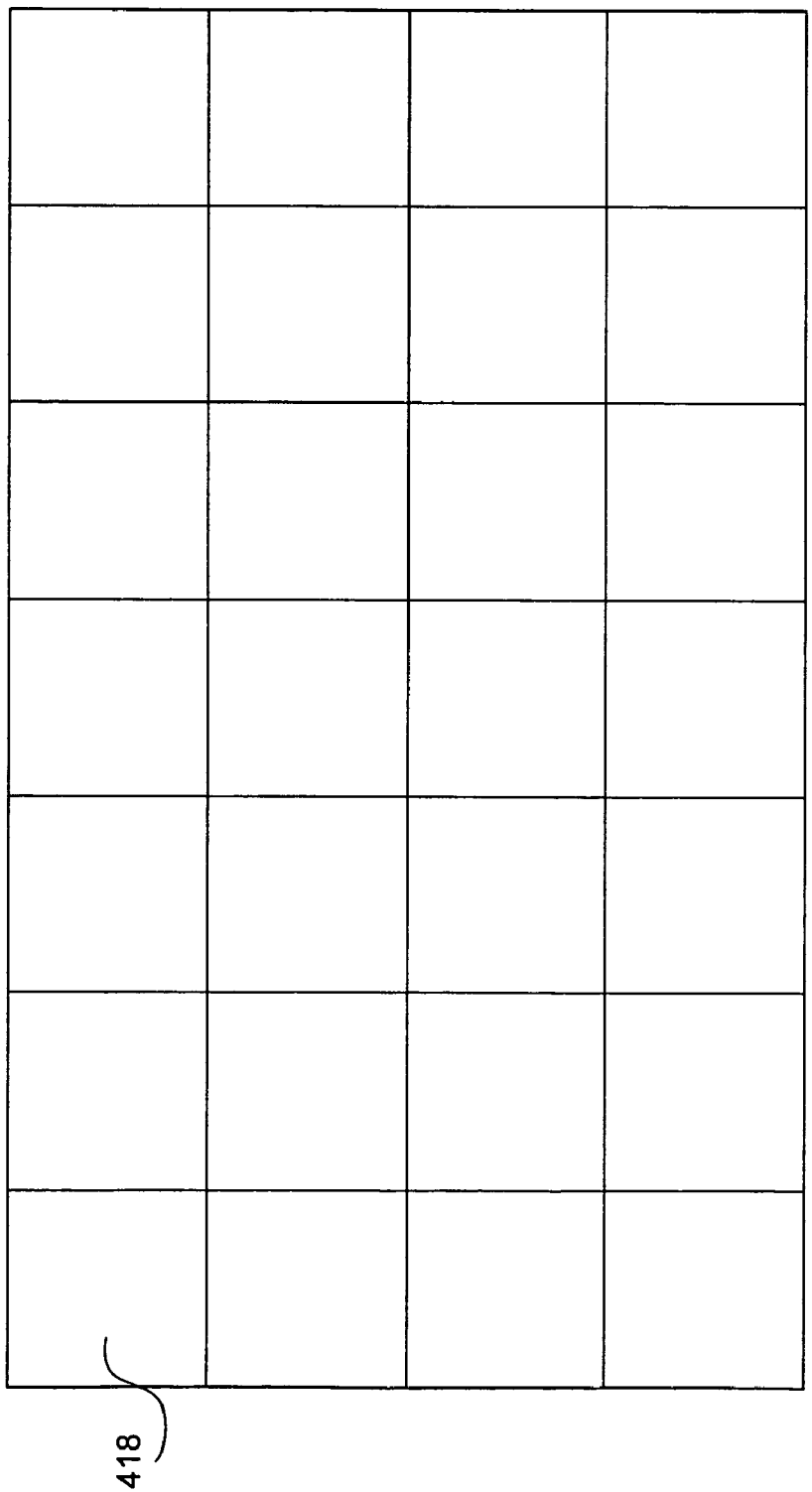
FIG. 4 is a diagram illustrating a procedure for dividing an image into pixel blocks, in accordance with one embodiment of the present invention.

Referring now to FIG. 4, a diagram illustrating a procedure for dividing an image 216 into pixel blocks 418 is shown, in accordance with one embodiment of the present invention. The FIG. 4 embodiment is presented for purposes of illustration, and in alternate embodiments, the present invention may readily include various other techniques and elements, in addition to, or instead of, those techniques and elements discussed in conjunction with the FIG. 4 embodiment. Furthermore, various steps and techniques for implementing the present invention will be sequentially presented during the following discussion of FIGS. 4 through 8B. However, the present invention may readily utilize steps and sequences other than certain of those steps and sequences discussed in conjunction with the embodiment of FIGS. 4 through 8B.

In certain embodiments, texture histogram calculator (THC) 220 initially converts individual images 216 from a color format into corresponding grey-scale images. For example, a color image in a RGB format may be converted into a YUV image in which the Y components become the grey-scale values of the corresponding grey-scale image. THC 220 then divides grey-scale image 216 into a series of contiguous pixel blocks. In FIG. 4, one exemplary pixel block 418 is shown in the top left position of image 216. In the FIG. 4 embodiment, image 216 is shown with seven horizontal pixel blocks and four vertical pixel blocks. In alternate embodiments, any desired number of pixel blocks 418 may be utilized.

Figure 5:
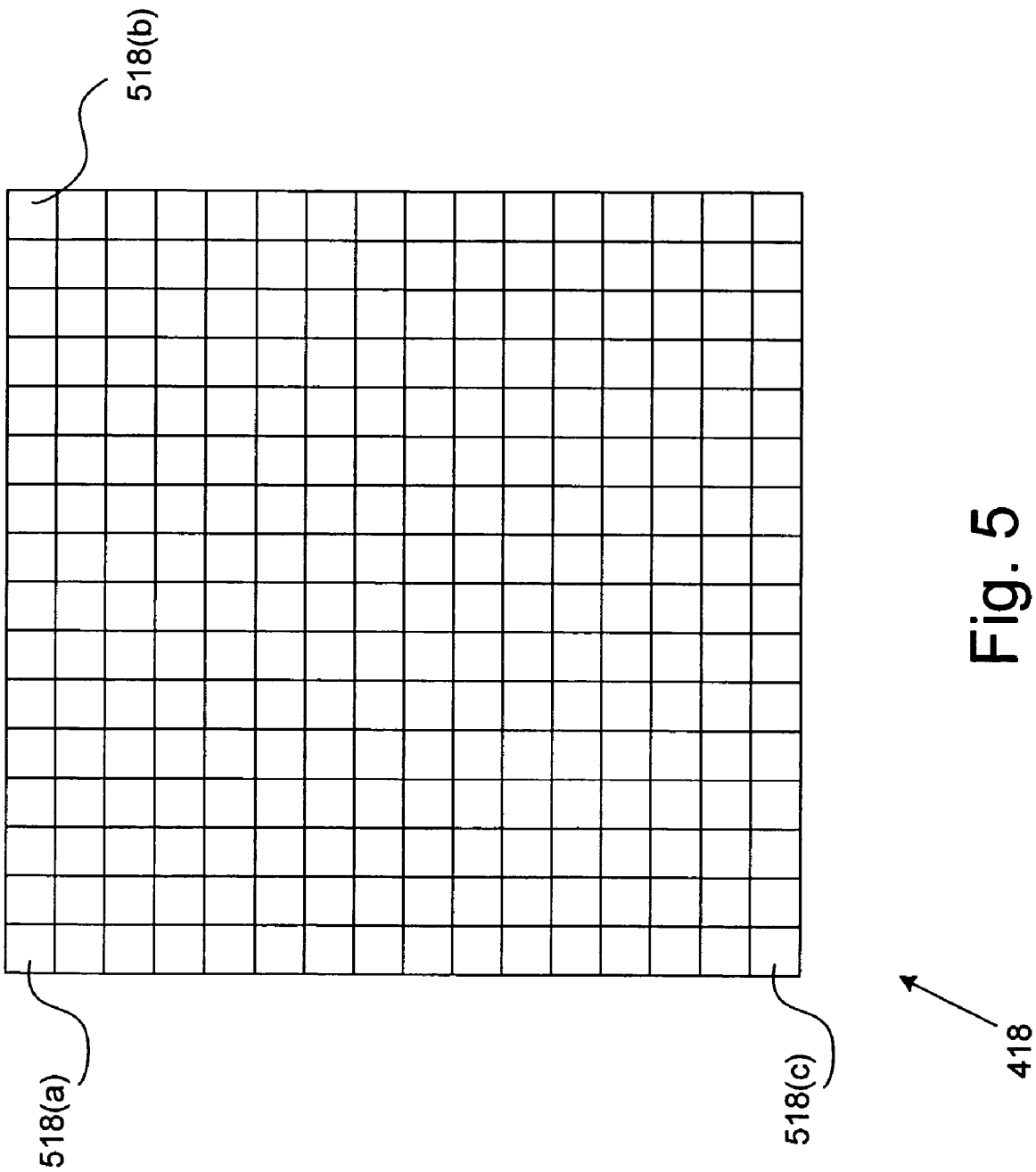
FIG. 5 is a diagram illustrating an exemplary pixel block of FIG. 4, in accordance with one embodiment of the present invention.

Referring now to FIG. 5, a diagram illustrating an exemplary FIG. 4 pixel block 418 is shown, in accordance with one embodiment of the present invention. The FIG. 5 embodiment is presented for purposes of illustration, and in alternate embodiments, the present invention may readily utilize pixel blocks 418 with elements and configurations, in addition to, or instead of, certain of those elements and configurations discussed in conjunction with the FIG. 5 embodiment.

In accordance with the present invention, THC 220 (FIG. 2) implements pixel block 418 with optimized pixel dimensions that facilitate accurate image search procedures. If the horizontal and vertical pixel dimensions of pixel block 418 are too small, then it may be difficult to distinguish between noise components and texture information in various images 216. Conversely, if the horizontal and vertical pixel dimensions of pixel block 418 are too large, then multiple different textures may more likely be included in a single pixel block 418.

In the FIG. 5 embodiment, pixel block 418 is configured to have pixel dimensions of 16 horizontal pixels and 16 vertical pixels. For example, a first horizontal pixel row in pixel block 418 extends from top left pixel 518(*a*) to top right pixel 518(*b*). In addition, a first vertical pixel column in pixel block 418 extends from top left pixel 518(*a*) to bottom left pixel 518(*c*). In accordance with the present invention, after image 216 is divided into pixel blocks 418, then THC 220 (FIG. 2) may perform Discrete Fourier Transforms upon the pixel rows and pixel columns from the pixel blocks 418 of each image 216 to generate corresponding DFT coefficients.

Figure 6B:
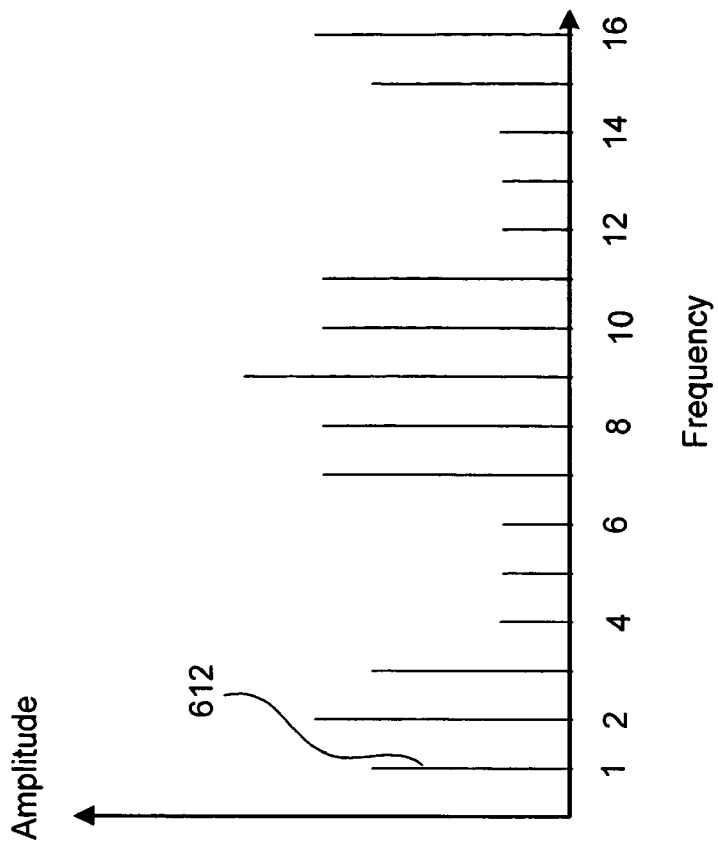
FIGS. 6A and 6B are graphs illustrating a Discrete Fourier Transform procedure, in accordance with one embodiment of the present invention.
Figure 6A:
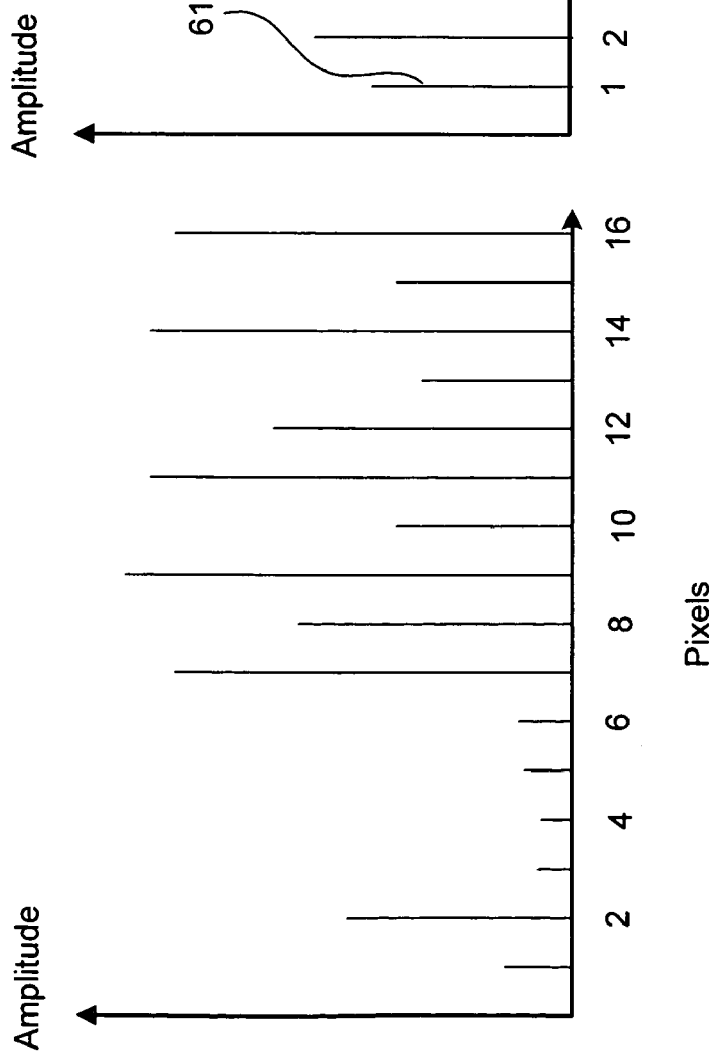

Referring now to FIGS. 6A and 6B, graphs illustrating a Discrete Fourier Transform (DFT) procedure are shown, in accordance with one embodiment of the present invention. The embodiments of FIGS. 6A and 6B are presented for purposes of illustration, and in alternate embodiments, the present invention may readily include techniques and elements, in addition to, or instead of, certain of those techniques and elements discussed in conjunction with the embodiments of FIGS. 6A and 6B. For example, in FIG. 6A, the amplitude and number of pixels represented may differ from those shown in the FIG. 6A embodiment. Similarly, in FIG. 6B, the frequency and number of DFT coefficients represented may differ from those shown in the FIG. 6B embodiment.

The FIG. 6A graph includes a horizontal axis that shows pixels 518 from either a horizontal pixel row (FIG. 5) or a vertical pixel column (FIG. 5). The FIG. 6A graph also includes a vertical axis that shows the grey-scale amplitude of each of the pixels 518. In the FIG. 6A example, amplitudes for the sixteen pixels from either the pixel rows or the pixel columns of the FIG. 5 embodiment are shown.

In accordance with the present invention, THC 220 (FIG. 2) performs a known Discrete Fourier Transform (DFT) procedure upon each of the pixel rows and pixel columns in pixel blocks 418 of images 216 to produce corresponding DFT coefficients as shown in FIG. 6B. The FIG. 6B graph includes a vertical axis that shows DFT coefficients corresponding to the DFT procedure performed upon either a horizontal pixel row or a vertical pixel column of a pixel block 418 (FIG. 5). The DFT coefficients of FIG. 6B represent the frequency of amplitude changes for the grey-scale pixels shown in FIG. 6A. In the FIG. 6B embodiment, the first DFT coefficient 612 is a DC coefficient that is equal to an average of the pixel values. The utilization of DFT coefficients is further discussed below in conjunction with FIGS. 7A and 7B.

Figure 7A:
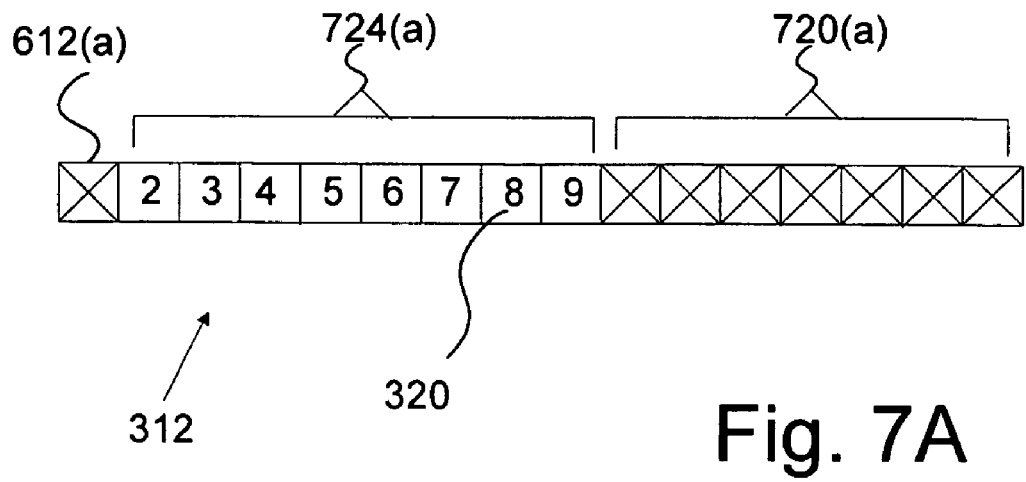
FIGS. 7A and 7B are diagrams illustrating a procedure for identifying horizontal peak values and vertical peak values, in accordance with one embodiment of the present invention.
Figure 7B:
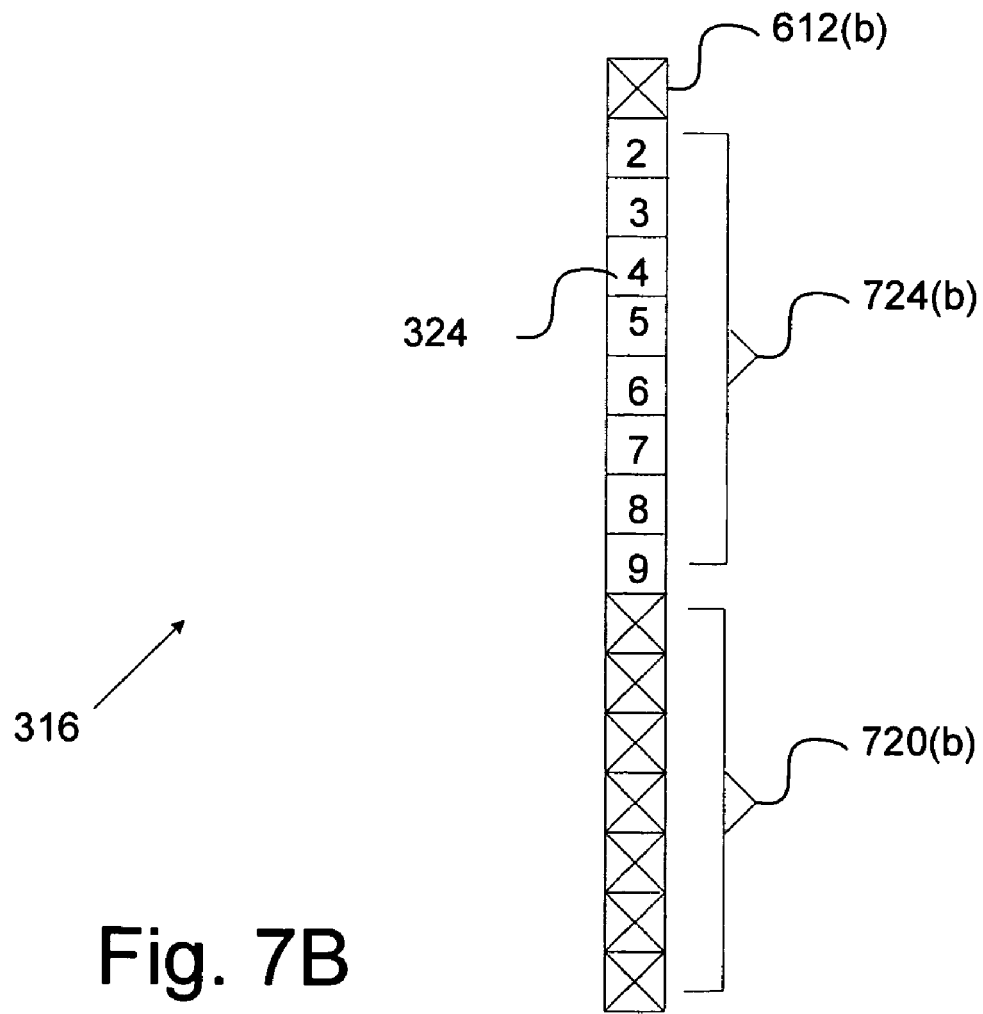

Referring now to FIGS. 7A and 7B, diagrams illustrating a procedure for identifying horizontal peak values and vertical peak values are shown, in accordance with one embodiment of the present invention. The embodiments of FIGS. 7A and 7B are presented for purposes of illustration, and in alternate embodiments, the present invention may readily include other techniques and elements, in addition to, or instead of, certain of those techniques and elements discussed in conjunction with the embodiments of FIGS. 7A and 7B.

In the FIG. 7A embodiment, a row of horizontal DFT coefficients 312 are shown to illustrate locating a horizontal peak value 320. In the FIG. 7A example, horizontal DFT coefficients 312 may correspond to the DFT coefficients shown in FIG. 6B. In certain embodiments, THC 220 (FIG. 2) may disregard DC coefficient 612(a) because no texture information is represented by DC coefficient 612(a). Furthermore, because of a known symmetry property of Discrete Fourier Transforms, THC 220 may also disregard the higher seven DFT coefficients 720(a) of horizontal DFT coefficients 312 because they are a mirror image of the lower DFT coefficients.

Therefore, THC 220 examines a reduced set 724(a) of horizontal DFT coefficients (DFT coefficient 2 through DFT coefficient 9) to locate a maximum horizontal DFT coefficient which becomes a horizontal peak value 320 for the corresponding horizontal DFT coefficients 312. In certain embodiments, if the horizontal peak value 320 is below a predetermined horizontal threshold value, then THC 220 sets the horizontal peak value 320 equal to the corresponding DC coefficient 612(a) for the current pixel row. In accordance with the present invention, THC 220 may then populate a horizontal texture histogram with the horizontal peak values 320 for each of the horizontal pixel rows of each pixel block 418 in a given image 216.

In the FIG. 7B embodiment, a column of vertical DFT coefficients 316 are shown to illustrate locating a vertical peak value 324. In the FIG. 7B example, vertical DFT coefficients 316 may correspond to the DFT coefficients shown in FIG. 6B. In certain embodiments, THC 220 (FIG. 2) may disregard DC coefficient 612(b) because no texture information is represented by DC coefficient 612(b). Furthermore, because of a known symmetry property of Discrete Fourier Transforms, THC 220 may also disregard the higher seven DFT coefficients 720(b) of vertical DFT coefficients 316 because they are a mirror image of the lower DFT coefficients.

Therefore, THC 220 examines a reduced set 724(b) of vertical DFT coefficients (DFT coefficient 2 through DFT coefficient 9) to locate a maximum vertical DFT coefficient which becomes a vertical peak value 324 for the corresponding vertical DFT coefficients 316. In certain embodiments, if the vertical peak value 324 is below a predetermined vertical threshold value, then THC 220 sets the vertical peak value 324 equal to the corresponding DC coefficient 612(b) for the current pixel column. In accordance with the present invention, THC 220 may then populate a vertical texture histogram with the vertical peak values 324 for each of the vertical pixel rows of each pixel block 418 in a given image 216.

In certain embodiment, instead of populating texture histograms with peak values 320 from each horizontal pixel row and each vertical pixel column of a pixel block 418, THC 220 may perform a horizontal DFT coefficient summation procedure to add corresponding horizontal DFT coefficients from all pixel rows in a given pixel block 418 to produce summed horizontal DFT coefficients representing the entire pixel block 418. A summed horizontal peak value may then be identified to represent the entire pixel block 418 for populating a corresponding horizontal texture histogram. Similarly, THC 220 may perform a vertical DFT coefficient summation procedure to add corresponding vertical DFT coefficients from all pixel columns in a given pixel block 418 to produce summed vertical DFT coefficients representing the entire pixel block 418. A summed vertical peak value may then be identified to represent the entire pixel block 418 for populating a corresponding vertical texture histogram.

Figure 8A:
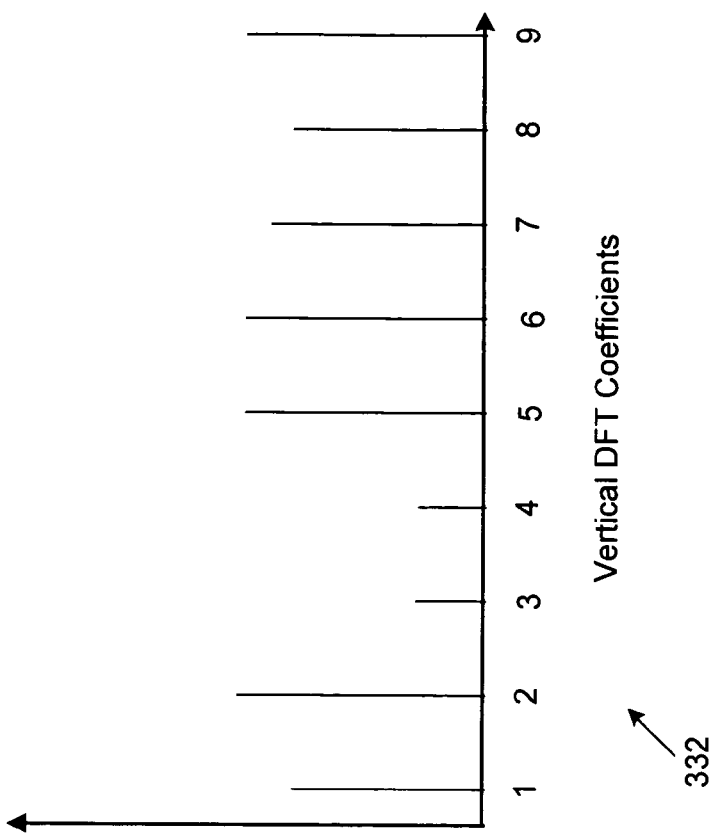
FIGS. 8A and 8B are diagrams illustrating a horizontal texture histogram and a vertical texture histogram, in accordance with one embodiment of the present invention.
Figure 8B:
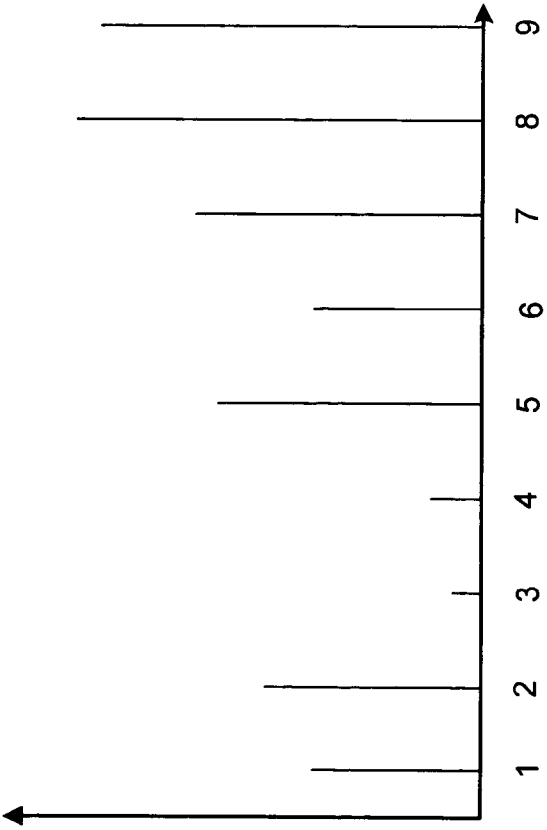

Referring now to FIGS. 8A and 8B, diagrams illustrating a horizontal texture histogram 328 and a vertical texture histogram 332 for a corresponding image 216 are shown, in accordance with one embodiment of the present invention. The embodiments of FIGS. 8A and 8B are presented for purposes of illustration, and in alternate embodiments, the present invention may readily include other techniques and elements, in addition to, or instead of, certain of those techniques and elements discussed in conjunction with the embodiments of FIGS. 8A and 8B. For example, in FIGS. 8A and 8B, the observation frequencies and number of DFT coefficients represented may differ from those shown in FIGS. 8A and 8B.

In the FIG. 8A embodiment, horizontal texture histogram 328 includes a horizontal axis with nine "bins" that each correspond to a different one of the reduced set 724(a) of horizontal DFT coefficients discussed above in conjunction with FIG. 7A. In particular, horizontal texture histogram 328 shows horizontal DFT coefficients 2 through 9. In the FIG. 8A embodiment, horizontal texture histogram 328 also includes a vertical axis corresponding to observations of horizontal peak values 320 in a given image 216. THC 220 (FIG. 2) may therefore populate horizontal texture histogram 328 by incrementing the appropriate histogram bin each time a horizontal peak value 320 is observed for a corresponding horizontal DFT coefficient.

Similarly, in the FIG. 8B embodiment, vertical texture histogram 332 includes a horizontal axis with nine "bins" that each correspond to a different one of the reduced set of vertical DFT coefficients 724(b) discussed above in conjunction with FIG. 7B. In particular, vertical texture histogram 332 shows vertical DFT coefficients 2 through 9. In the FIG. 8B embodiment, vertical texture histogram 332 also includes a vertical axis corresponding to observations of vertical peak values 324 in a given image 216. THC 220 may therefore populate vertical texture histogram 332 by incrementing the appropriate histogram bin each time a vertical peak value 324 is observed for a corresponding vertical DFT coefficient.

In accordance with the present invention, horizontal texture histogram 328 and vertical texture histogram 332 thus represent texture characteristics of a corresponding image 216. For example, texture histograms with larger amplitudes in the higher DFT coefficients indicate fine texture detail, while texture histograms with larger amplitudes in the lower DFT coefficients indicate coarse textures or no texture. A texture feature detector (TFD) 218 (FIG. 2) may therefore perform an image search procedure to locate similar images 216 by comparing the respective horizontal texture histograms 328 and vertical texture histograms 332 for some or all stored images 216.

TFD 218 may utilize any appropriate techniques to compare the horizontal texture histograms 328 and vertical texture histograms 332. For example, TFD 218 may calculate a known Earth Mover's Distance (EMD) to quantify the similarity of any two horizontal texture histograms 328 or any two vertical texture histograms 332. The EMD for two horizontal texture histograms may provide a horizontal similarity score in which the lowest score indicates the greatest similarity. The EMD for two vertical texture histograms may likewise provide a vertical similarity score in which the lowest score indicates the greatest similarity.

The EMD procedure for comparing any two texture histograms may be described as follows: Analogize a set A (bins in a first histogram) to piles of earth of various sizes, and analogize a set B (bins in a second histogram) to holes of various sizes. The EMD may then be calculated as the least amount of total work required to move the "earth" into the "holes". The EMD therefore may be expressed as the amount of earth moved times the distance that the earth is moved. The EMD is further discussed in "A Metric For Distributions With Applications To Image Databases," by Rubner, Y., Tomasi, C., and Guibas, L. J., Computer Vision, 1998, Sixth International Conference on Computer Vision on 4-7 Jan. 1998, pages 59-66.

TFD 218 may then set a final overall similarity score for any two images 216 to be equal to the worst (lowest degree of similarity) of either the horizontal similarity score or the vertical similarity score. TFD 218 may locate one or more matching/similar images 216 by evaluating the final overall similarity scores for each pair of images 216. In accordance with certain embodiments of the present invention, THC 220 (FIG. 2) and TFD 218 (FIG. 2) may also utilize the foregoing techniques to create and compare additional diagonal texture histograms (based upon diagonal pixel rows) for pairs of images 216 to increase search accuracy characteristics. Furthermore, the present invention may be effectively utilized in conjunction with a color feature detector to improve image recognition performance.

Figure 9:
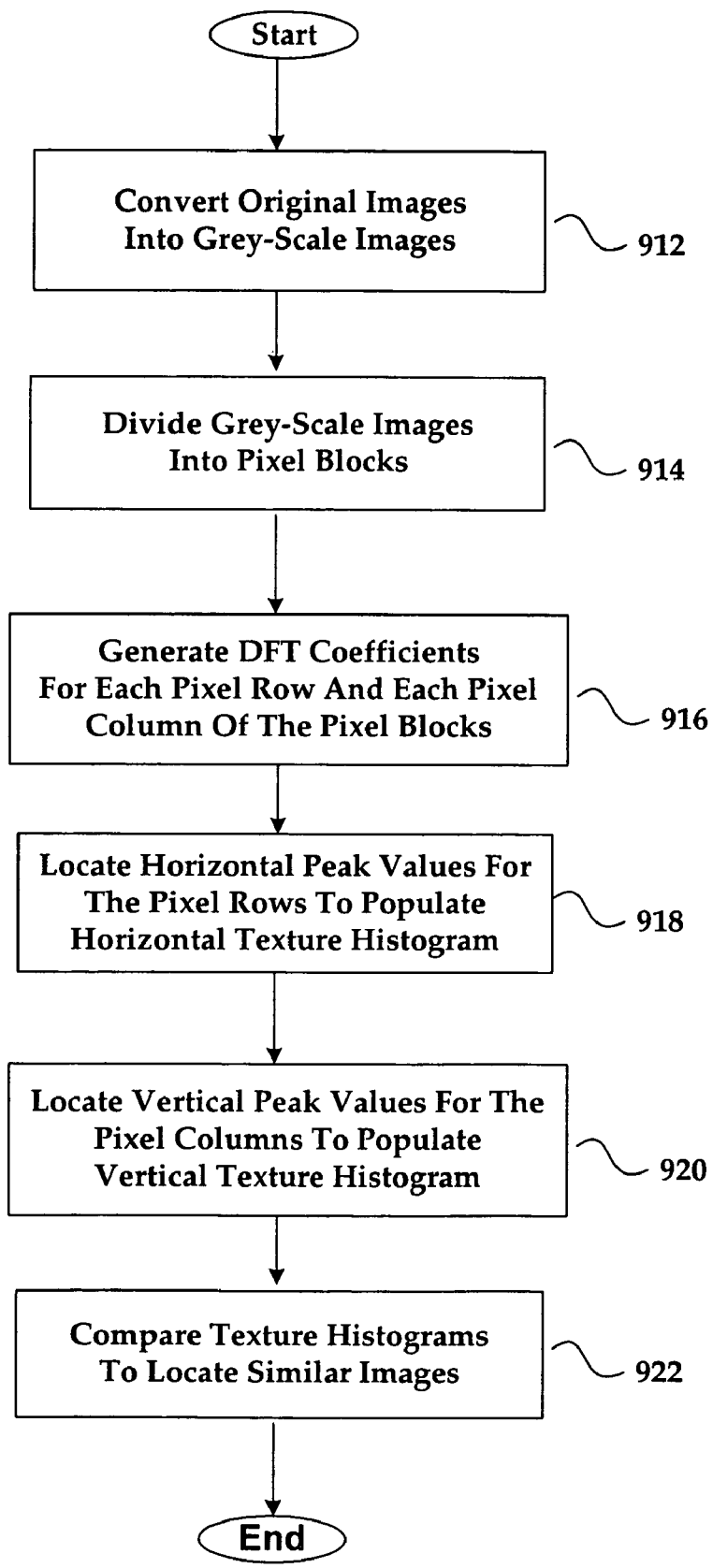
FIG. 9 is a flowchart of method steps for effectively implementing a texture feature detector, in accordance with one embodiment of the present invention.

Referring now to FIG. 9, a flowchart of method steps for effectively implementing a texture detector is shown, in accordance with one embodiment of the present invention. The FIG. 9 example is presented for purposes of illustration, and, in alternate embodiments, the present invention may readily utilize steps and sequences other than certain of those discussed in conjunction with the FIG. 9 embodiment.

In the FIG. 9 embodiment, in step 912, a texture histogram calculator 220 initially converts original images 216 into corresponding grey-scale images. Then, in step 914, texture histogram calculator 220 divides the grey-scale images into a pre-defined number of contiguous pixel blocks 418 that each include an array of horizontal pixel rows and vertical pixel columns. In step 916, texture histogram calculator 220 performs Discrete Fourier Transform (DFT) procedures upon the horizontal pixel rows and vertical pixel columns of each of the pixel blocks 418 to generate corresponding horizontal DFT coefficients and vertical DFT coefficients.

In step 918, texture histogram calculator 220 locates horizontal peak values 320 for each of the horizontal pixel rows. Each horizontal peak value 320 may correspond to the largest horizontal DFT coefficient for a given horizontal pixel row. Texture histogram calculator 220 may then populate a horizontal texture histogram 328 for each image 216 with the corresponding horizontal peak values 320.

In step 920, texture histogram calculator 220 locates vertical peak values 324 for each of the vertical pixel columns. Each vertical peak value 324 may correspond to the largest vertical DFT coefficient for a given vertical pixel column. Texture histogram calculator 220 may then populate a vertical texture histogram 332 for each image 216 with the corresponding vertical peak values 324.

Finally, in step 922, a texture feature detector 218 may perform an image search procedure by comparing the horizontal texture histograms 328 and vertical texture histograms 332 to locate similar images 216. The FIG. 9 process for calculating and utilizing texture histograms may be performed at any appropriate time. For example, in various embodiments, texture histograms may be calculated at any time from the capture of the image data until the image search procedure. For at least the foregoing reasons, the present invention provides an improved system and method for effectively implementing a texture feature detector.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for performing an image search procedure with an electronic device, comprising:

a histogram calculator that performs image analysis procedures without user input to construct texture histograms corresponding to texture characteristics of images accessed by said electronic device; and a feature detector that performs said image search procedure by comparing said texture histograms to identify one or more matching images in which said texture characteristics are similar, said histogram calculator and said feature detector being stored on a computer-readable medium having computer-executable instructions for causing a computer to perform said computer-executable instructions.

2. The system of claim 1 wherein said texture histograms include a horizontal texture histogram and a vertical texture histogram for each of said images.

3. The system of claim 1 wherein said histogram calculator initially converts said images into a grey-scale format.

4. The system of claim 1 wherein said histogram calculator divides said images into sets of pixel blocks.

5. The system of claim 4 wherein each of said pixel blocks has pixel dimensions of sixteen horizontal pixels by sixteen vertical pixels.

6. The system of claim 4 wherein said histogram calculator performs Discrete Fourier Transform procedures upon each of said pixel blocks to produce DFT coefficients.

7. The system of claim 6 wherein said DFT coefficients correspond to horizontal pixel rows and vertical pixel columns from said each of said pixel blocks.

8. The system of claim 7 wherein said histogram calculator sums said DFT coefficients for said horizontal pixel rows to produce summed horizontal DFT coefficients for said each of said pixel blocks, said histogram calculator also summing said DFT coefficients for said vertical pixel columns to produce summed vertical DFT coefficients for said each of said pixel blocks.

9. The system of claim 6 wherein said histogram calculator disregards a lowest DC coefficient from said DC coefficients.

10. The system of claim 6 wherein said histogram calculator disregards upper DC coefficients eight through sixteen from said DC coefficients.

11. The system of claim 6 wherein said histogram calculator identifies horizontal peak values corresponding to maximum horizontal DFT coefficients from horizontal pixel rows of said pixel blocks.

12. The system of claim 11 wherein said histogram calculator populates horizontal texture histograms for said images by utilizing said horizontal peak values.

13. The system of claim 6 wherein said histogram calculator identifies vertical peak values corresponding to maximum vertical DFT coefficients from vertical pixel columns of said pixel blocks.

14. The system of claim 13 wherein said histogram calculator populates vertical texture histograms for said images by utilizing said vertical peak values.

15. The system of claim 6 wherein said histogram calculator sets peak values for populating said texture histograms equal to corresponding DC coefficients if said peak values are less than a predetermined threshold value.

16. The system of claim 1 wherein said feature detector compares horizontal texture histograms for each of said images during said image search procedure to determine a horizontal texture similarity score, said feature detector also comparing vertical texture histograms for each of said images during said image search procedure to determine a vertical texture similarity score.

17. The system of claim 16 wherein said feature detector calculates an overall similarity score for each pair of said images by taking the worst of either said horizontal texture similarity score or said vertical texture similarity score.

18. The system of claim 1 wherein said feature detector compares said texture histograms by calculating an Earth Mover's Distance value for pairs of said texture histograms corresponding to said images.

19. The system of claim 1 wherein said texture histograms include a horizontal texture histogram, a vertical texture histogram, and a diagonal texture histogram for each of said images.

20. A method for performing an image search procedure with an electronic device, comprising the steps of:

performing image analysis procedures without user input by utilizing a histogram calculator that automatically constructs texture histograms corresponding to texture characteristics of images accessed by said electronic device; and utilizing a feature detector to perform said image search procedure by comparing said texture histograms to identify one or more matching images in which said texture characteristics are similar, said histogram calculator and said feature detector being stored on a computer-readable medium having computer-executable instructions for causing a computer to perform said computer-executable instructions.

* * * * *

UNITED STATES PATENT AND TRADEMARK OFFICE
CERTIFICATE OF CORRECTION

PATENT NO. : 7,609,885 B2
APPLICATION NO. : 11/196981
DATED : October 27, 2009
INVENTOR(S) : Gunnar Hovden It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1119 days.

Signed and Sealed this

Twelfth Day of October, 2010

David J. Kappos
*Director of the United States Patent and Trademark Office*